L. A. LANG.
FLUID PRESSURE CONTROLLING APPARATUS.
APPLICATION FILED OCT. 12, 1917.
1,358,166.
Patented Nov. 9, 1920.
2 SHEETS—SHEET 1.
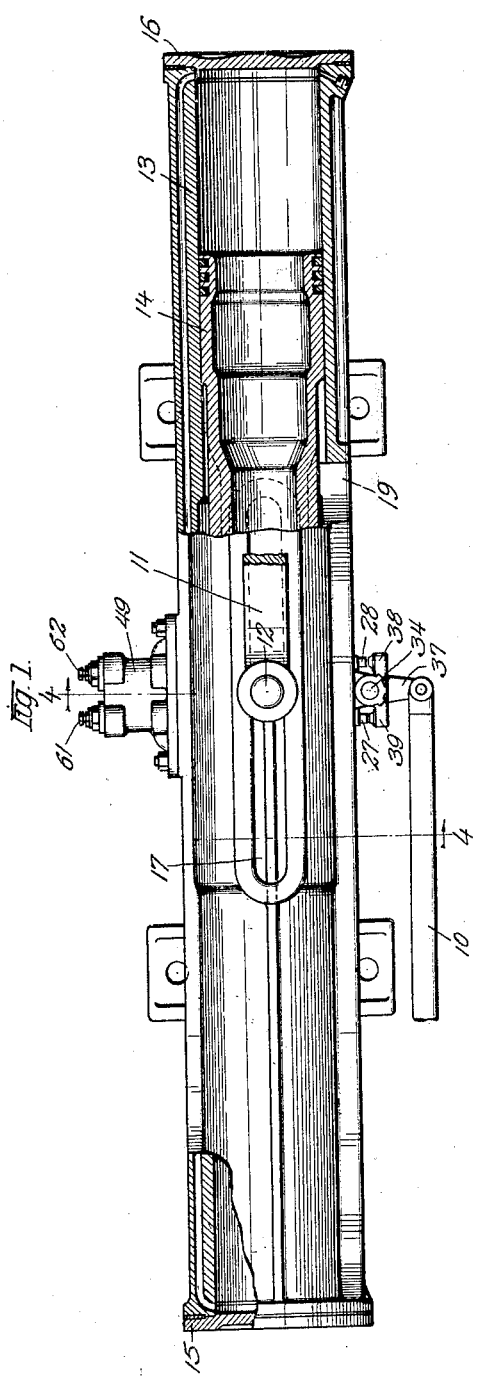
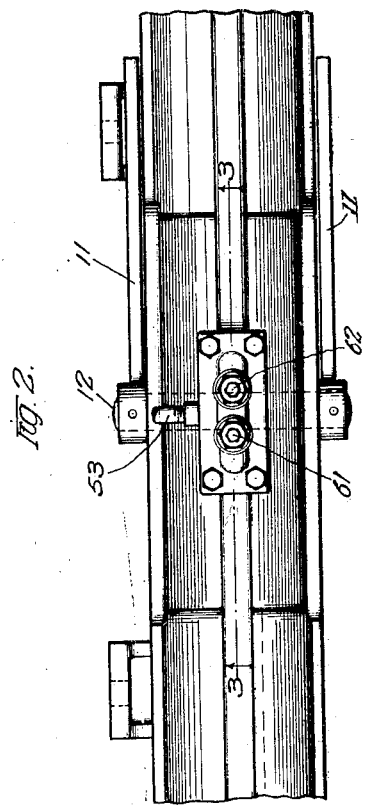

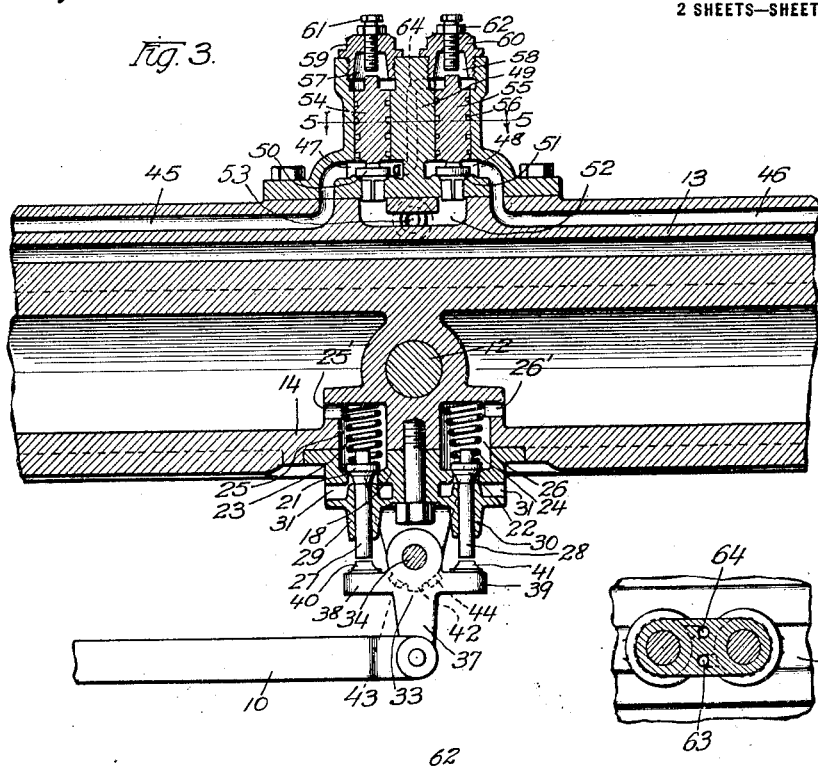

UNITED STATES PATENT OFFICE.

LINCOLN A. LANG, OF CHICAGO, ILLINOIS, ASSIGNOR TO THE NORTHERN TRUST COMPANY, OF CHICAGO, ILLINOIS, A CORPORATION OF ILLINOIS, (TRUSTEE.)

FLUID-PRESSURE-CONTROLLING APPARATUS.

1,358,166.   Specification of Letters Patent.   Patented Nov. 9, 1920.

Application filed October 12, 1917. Serial No. 196,115.

*To all whom it may concern:*

Be it known that I, LINCOLN A. LANG, a citizen of the United States, residing at Chicago, in the county of Cook and State of Illinois, have invented certain new and useful Improvements in Fluid-Pressure-Controlling Apparatus, of which the following is a specification.

My invention relates to improvements in fluid pressure controlling apparatus, and, although capable of various applications, is of particular service when utilized in connection with those devices known among mechanical engineers as "servo motor follow-up mechanisms."

In the usual type of servo motor mechanisms, the position of a ponderous member is controlled by a piston in a cylinder to which fluid is supplied by means of some form of valve mechanism actuated by a manual-control device, the arrangement being such that a certain movement of the handle will actuate the valves to move the piston a like proportionate amount, the piston being so connected to the valve mechanism that at the completion of such proportionate movement the valve mechanism is restored to normal condition and the piston brought to rest. In such mechanisms as heretofore constructed, the valves for controlling the flow of fluid, both to and from the cylinder, are all actuated mechanically.

In practice, considerable difficulty is experienced in so organizing the valve mechanism and in so timing the speed and degree of opening of the exhaust and the inlet valves as to secure proper operation of the device under different conditions. For instance, in order to secure great sensitiveness and an accurate positioning of the ponderous member in accordance with the movement of the handle or other manually-operated member, it is necessary to secure a sudden sharp and positive opening of both sets of valves, inlet and exhaust. On the other hand, it frequently happens that such an adjustment results in a surging or "hunting" movement of the piston in the cylinder, due to momentum or external forces applied to the ponderous member. These different conditions are directly contradictory as to their mechanical requirements, and, so far as I am aware, existing types of servo-motor mechanisms have consequently been more or less of a compromise.

The principal objects of the present invention are to provide in a device of the class described automatic means for controlling the opposed forces acting indirectly on the ponderous member, by reason of changes in said forces incident to the actuation of other directly actuated mechanism; to provide an arrangement of the class described which shall be so organized as substantially to eliminate packings and other force-consuming instrumentalities, thereby improving the mechanical construction in various ways, besides requiring much less power to actuate the valve mechanism; to provide an arrangement which may be so organized as to respond to certain predetermined operating conditions; to provide a factory-built and adjusted apparatus so designed and constructed by experts as to remove the possibility of improper adjustment by persons in practical charge of the mechanism; to provide a device of the class described which may be made sensitive and positive in its action, while at the same time, hunting, creeping, or other improper movements of the piston in the cylinder are prevented; to provide a construction of the class described which shall be simple in design and economical to manufacture; and, in general, to provide an improved and efficient apparatus of the character referred to.

In the drawings, which illustrate my invention as applied to the reversing gear of a steam locomotive—

Figure 1 is a side elevation of the cylinder and associated apparatus, certain parts being sectionalized the better to illustrate the interior construction;

Fig. 2 is a plan view of the central portion of Fig. 1;

Fig. 3 is an enlarged section taken on the line 3—3 of Fig. 2;

Fig. 4 is a section taken on the line 4—4 of Fig. 1;

Fig. 5 is a section taken on the line 5—5 of Fig. 3; and Fig. 6 is a section of a modified form of valve.

Referring to the drawings, 10 represents a link or connecting rod which is connected to a manually-operable member, such as a hand-lever, which can be adjusted in a number of various positions intended to correspond with the particular valve adjustment desired. The valve gear of the locomotive is controlled by means of a pair of connecting links 11, shown best in Fig. 2, keyed to the ends of a short shaft 12. Power to operate the said links 11 by moving the pin 12 is supplied by pressure fluid, preferably air, admitted to a stationary elongated cylinder 13, within which reciprocates an elongated piston 14. The ends of the said cylinder 13 are closed by heads 15 and 16 and the pin 12 is journaled in the center of the elongated piston 14, the ends of said pin projecting through opposite side walls of the cylinder 13, slots 17 being cut therein for that purpose.

The arrangement so far described is quite similar to the construction set forth in my co-pending application Serial No. 169,217, filed May 17, 1917.

In this application, the admission of fluid under pressure to opposite ends of the cylinder 13 is automatically controlled by reason of differences in pressure between the opposite ends of the piston, due to actuation of the exhaust valves which control egress of fluid from the cylinder. The exhaust valves are manually operated by the control rod 10.

The exhaust valve mechanism is carried by a housing 18 bolted centrally to the lower side of the piston 14 and projecting downwardly through a slot 19 formed in the bottom wall of the cylinder 13. It should be understood that the cylinder 13 and the piston 14 are of sufficient length to allow for a proper length of reciprocatory movement of the piston in the cylinder, in spite of the slots 17 and 19.

The exhaust valves 21 and 22 are of the puppet type and are normally subjected to the pressure of the fluid in opposite ends of the cylinder. Such pressure, added to the pressure of the compression springs 23 and 24, serves effectively to prevent leakage of said valves. In order to permit convenient assembly of the various valve parts, the cleavage line separating the valve housing 18 from the piston 14 extends through the valve pockets 25 and 26 containing the springs 23 and 24. The upper ends of the valve pockets 25 and 26 are suitably ported, as shown at 25' and 26' to communicate with opposite ends of the cylinder through the end cavities of the hollow piston 14. The stems 27 and 28, which are formed as integral parts of the valves 21 and 22, extend loosely through guides 29 and 30 which do not need to be gas-tight, in view of the fact that the openings 31 and 32 exhaust directly into the atmosphere. In the embodiment described herein, the valves are located with their axes vertical and spaced apart along a longitudinal center line parallel with the axis of the main cylinder 13. Such location of the valves permits of their convenient manipulation by means of a rock-lever 33 pivotally mounted on a horizontal shaft 34 mounted in a pair of spaced-apart lugs 35 and 36 formed as integral parts of the housing 18. The rock-lever 33 has a depending arm 37 which is pivotally connected to the end of the control rod 10, and it is also equipped with a pair of horizontal oppositely disposed arms 38 and 39 in the ends of which are tappets 40 and 41 registering with the ends of the valve stems 27 and 28. Obviously, a reciprocatory movement of the control rod 10 will effect opening of one or other of the exhaust valves, and fluid will therefore be discharged from the corresponding end of the cylinder 13. Excessive movement of the rocker arm 37 is prevented by a stop-lug 42 formed integrally therewith which plays between the fixed stops 43 and 44 on one of the lugs.

Fluid under pressure is admitted to opposite ends of the cylinder through a pair of longitudinally-extending ports 45 and 46 which terminate in valve chambers 47 and 48 located in the bottom portion of a duplex integral valve-housing 49 bolted to the top wall of the cylinder 13. The valve-chambers 47 and 48 contain automatic valves 50 and 51 of the puppet type which when closed prevent pressure fluid from passing out of the end of the supply cavity 52. Air under pressure is conducted to the supply cavity through a pipe 53 connected to a convenient source of compressed air.

Immediately above the puppet valves 50 and 51 are a pair of solid pistons 54 and 55 arranged to reciprocate in cylindrical apertures bored in the upwardly-extending portion of the duplex valve-housing 49. In order to minimize friction, the comparatively minute pistons 54 and 55 are not equipped with packing rings, but are simply grooved circumferentially, as shown at 56. For a purpose which will hereinafter appear, the diameters of the pistons 54 and 55 are slightly greater than the respective diameters of the puppet valves 50 and 51. Immediately above the upper ends of the pistons 54 and 55 are a pair of what may be termed "equalizing chambers" 57 and 58, the upper ends of said chambers being formed by the inner ends of a pair of caps 59 and 60 screwed down into the upper ends of the said cavities 57 and 58. The lift of the pistons 54 and 55 may be suitably regulated or adjusted by the adjustment screws 61 and 62.

The left-hand equalizing chamber 57 is connected to the right-hand end of the cylinder by a cross-connecting conduit 63, and the right-hand equalizing chamber 58 is connected to the left-hand end of the cylinder by a cross-connecting conduit 64, the lower ends of said conduits terminating, for convenience, in the valve pockets 48 and 47. Said cross-connecting conduits 63 and 64 serve to subject the upper ends of the valve-control pistons 54 and 55 to the pressure of fluid in the correspondingly opposite ends of the cylinder.

In describing the operation of the apparatus, we will first assume that the apparatus is in a dead condition, with the source of pressure fluid shut off. When the pressure is turned on, fluid which is thus admitted to the supply cavity 52 lifts both of the valves 50 and 51 and flows into opposite ends of the cylinder through the ports 45 and 46. Assuming now that the area of each of the pistons 54 and 55 is twenty-five per cent. greater than the area of the corresponding valves 50 and 51, and assuming that the supply pressure is one hundred pounds per square inch, it will be evident that as soon as the pressure in one or the other end of the cylinder reaches eighty pounds per square inch, the valve controlling the other end of the cylinder will be automatically closed by reason of such eighty pounds pressure being communicated to the upper end of the piston controlling such valve through the proper cross-connecting conduit. We will assume that for some reason, air flows more quickly into the right-hand end of the cylinder than into the left-hand end. This will cause the pressure in the right-hand end to reach eighty pounds per square inch while the pressure in the left-hand end of the cylinder is still inferior. Such eighty pounds pressure being communicated to the equalizing chamber 57 through the cross-connecting conduit 63, will depress the plunger 54 and close the valve 50, preventing further flow of pressure fluid into the left-hand end of the cylinder.

A condition now exists in which the equilibrium of the piston is destroyed, for two reasons: In the first place, the pressure in the left-hand end of the cylinder is less than the normal eighty pounds operating pressure; and in the second place, the result of such pressure in the left-hand end of the cylinder being less than normal is to cause the plunger 55 to fail to close the valve 48 and pressure fluid will continue to flow into the right-hand end of the cylinder. When a sufficient difference in pressure has been established between opposite ends of the cylinder, the piston will of course commence to move toward the left-hand end of the cylinder, and, because of the control rod 10 being stationary, the lever 33 will be rocked on its pivotal axis, thus actuating and opening the exhaust valve 22. Such opening of the exhaust valve 22 causes a sudden drop in pressure in the right-hand end of the cylinder, which reduces the pressure in the equalizing chamber 57 sufficiently to allow the valve 50 to re-open and permit pressure fluid to flow into the left-hand end of the cylinder until equilibrium is established.

The effect of the pressure-equalizing apparatus is considerably increased, by reason of the fact that the piston in moving toward the low-pressure end of the cylinder causes a compression of the fluid therein and a consequent building up of the pressure which increases the pressure on the top of the plunger controlling the valve in the high-pressure end of the piston. In addition, the valves 50 and 51 act as check valves to prevent reverse flow of pressure fluid back into the supply line.

The apparatus functions in substantially the above described manner whenever the piston is subjected to shocks or other externally applied pressure. For instance, assuming that the links 11 are subjected to a pulling stress which tends to move the piston toward the right-hand end of the cylinder, movement of the piston toward the right-hand end of the cylinder at once builds up pressure in the right-hand end of the cylinder, such pressure being communicated to the equalizing cavity 57 and effecting positive closure of the valve 50. At the same time, any slight movement of the piston in response to the pull on the links 11 becomes effective to rock the lever 33 in such direction as to open the exhaust valve 21. Fluid thereupon rushes out of the left-hand end of the cylinder, past the exhaust valve 21, the resultant drop in pressure being communicated to the cavity 58 and causing the high-pressure fluid in the cavity 52 to raise the valve 51 and enter the right-hand end of the cylinder to counteract the pull applied externally to the piston. Hence, any movement of the piston in either direction, due to external forces, will at once cause a building up of the pressure on one side of the piston to oppose such piston movement, and a reduction of pressure on the other side of the piston for a like purpose.

The apparatus is quickly and positively responsive to movement of the control rod 10. For example, assuming that the control rod 10 is moved toward the right, the effect of such movement is to rock the lever 33 in a direction to open the exhaust valve 22, whereupon pressure in the right-hand end of the cylinder will be relieved, permitting the plunger 54 to rise and admit high-pressure fluid through the port 45 into the left-hand end of the cylinder. The piston thereupon commences to move toward the right-hand end of the cylinder and continues such movement, following up the movement of the control rod 10 until the piston has reached a position which, in view of the final position reached by the control rod 10, brings the rock-lever 33 into neutral, with both exhaust valves closed.

It will of course be understood that when the control rod is moved to the right, in order to effect a like movement of the piston, the exhaust valve 22 is not required to open to its fullest extent, since even a very slight reduction in the pressure in the right-hand end of the cylinder will cause the piston to move independently of the increment in pressure in the left-hand end of the cylinder, due to the opening of the inlet valve 50. Hence, the difference in pressure between the two ends of the cylinder will simply be that which is necessary to move the piston and the load. In the ordinary case, the pressure in the right-hand end of the cylinder will drop but a few pounds lower than the normal mean pressure when the apparatus is stationary. The movement of the piston itself is sufficient in most cases to compress the remaining fluid in the low-pressure end of the cylinder until it reaches substantially said mean value, it being understood that the pressure in the high-pressure end is of course in excess of said mean value. If, when the piston arrives at its desired position, the excess in pressure in the left-hand or high-pressure end of the cylinder is more than sufficient to overcome the friction of the parts, there may be in such case a slight opening movement of the valve 27, which will reduce the pressure in the left-hand end of the cylinder to normal or mean value, thus restoring equilibrium of the apparatus.

In Fig. 6 I have illustrated a slightly modified form of automatic valve mechanism suitable for independent mounting. In such valve mechanism, the valve proper comprises a ball 65 coöperating with a suitable seat in a unitary valve housing 66, one of said valve housings being provided for each end of the cylinder. In order to enable such valve mechanisms to be mounted in convenient locations, without reference to the position of the main cylinder 13, separate pipes are employed leading to or from the various parts of the valve. To this end, 67 constitutes the main pressure supply pipe, 68 is a pipe connecting the valve pocket 69 with one end of the cylinder, and 70 is a small cross-connecting pipe leading from the other end of the cylinder to the upper equalizing chamber 71 over the control piston 72.

For some purposes, it may be of advantage to employ a spring 73 above the upper end of the piston 72, instead of relying on the difference in diameter between the piston 72 and the valve-ball 65. The use of such spring results in a fixed difference in pressure between the supply and the cylinder, instead of a proportionate difference, as in the case where the areas of plunger and valve are different.

In some instances it is advisable to differently proportion the relative areas of the two control plungers with their respective valves or to use springs of different strengths above the said plungers, in order to allow for an unbalanced load on the piston; for instance, to counteract the effect of gravity on certain heavy parts, either of the apparatus itself or of the devices which are being moved. The same remarks apply to a case where a piston rod is used in one end of the cylinder instead of connecting the load to the middle of the piston, as in the herein-described embodiment.

I claim:

1. In a device of the class described, the combination of a member acted upon by two opposed forces, positively-actuated mechanism for selectively modifying either of said forces, and means responsive to the change in the modified force for automatically effecting a contrary change in the other force.

2. In a device of the class described, the combination of a movable member acted upon by two opposed forces, positively-actuated mechanism for selectively altering either of said forces and means responsive to the change in the altered force for automatically effecting a contrary change in the other force upon movement of said member.

3. In a device of the class described, the combination of a movable member acted upon by two opposed forces, positively-actuated mechanism for selectively reducing either of said forces and means responsive to the change in the reduced force for automatically preventing a reduction in the other force upon movement of said member.

4. In a device of the class described, the combination of a control member, a load member acted upon by opposed, normally equilibrized forces, mechanism for selectively diminishing said forces and mechanism for selectively augmenting said forces, one of said mechanisms being so arranged with respect to said members that independent movement of either of said members will actuate said mechanism to alter one of said forces, and the other mechanism being arranged mechanically independent of the first mechanism, but indirectly actuated thereby automatically by the change in the force altered by the other mechanism.

5. In a device of the class described, the combination of a manually-actuated control member, a load member movable in opposite directions and acted upon by opposed, normally equilibrized forces, mechanism for selectively diminishing said forces, and mechanism for selectively augmenting said forces, one of said mechanisms being so arranged with respect to said members that independent movement of either of said members will actuate said mechanism to alter one of said forces, and the other mechanism being arranged mechanically independent of the first mechanism, but indirectly actuated thereby automatically by the change in the force altered by the other mechanism.

6. In a device of the class described, the combination of a load member movable in opposite directions and acted upon by two opposed normally equilibrized forces, a controlling member also movable in opposite directions, differentally-actuated mechanism movable into off-normal condition by independent movement of either of said members, for altering either of said forces and thereby applying power tending to move said load member, said power being applied in a direction to normalize said differential mechanism, and means automatically operated by the change in the said altered force for preventing a similar change in the other force.

7. In a device of the class described, the combination of a load member movable in opposite directions and acted upon by two opposed normally equilibrized forces, a controlling member also movable in opposite directions, differentially-actuated mechanism movable into off-normal condition by independent movement of either of said members, for reducing either of said forces and thereby applying power tending to move said load member, said power being applied in a direction to normalize said differential mechanism, and means automatically operated by the reduction in the said reduced force for preventing a reduction in the other force.

8. In a device of the class described, the combination of a load member movable in opposite directions and acted upon by two opposed normally equilibrized forces, a controlling member also movable in opposite directions, differentially-actuated mechanism movable into off-normal condition by independent movement of either of said members, for reducing either of said forces and thereby applying power tending to move said load member, said power being applied in a direction to normalize said differential mechanism, and means automatically operated by the reduction in the said reduced force for effecting an increase in the other force and thereby assisting the said power so applied.

9. In a motor control, in combination with the motor and its two-way acting power-delivering member, means for controlling the movements of said power-delivering member, comprising sources of motive power acting oppositely on said power-delivering member and normally holding it balanced and immovable, an independently operable automatic means controlling each supply of motive power, other means for unbalancing the power acting on said power-delivery member to move the latter either way, and cross-connected means between the unbalancing means and said automatic power controls, whereby operation of either unbalancing means to change the power value on one side automatically actuates the power control of the opposite side to bring about coöperation of that side supplementing the said unbalancing action.

10. In a motor control, in combination with the motor and its two-way acting power-delivering member, means for controlling the movements of said power-delivering member, comprising two independent sources of motive power acting oppositely on said power-delivering member and normally holding it balanced and immovable, an independently operable automatic means controlling each supply of motive power, direct actuated differential mechanical means for unbalancing the power acting on said power-delivery member to move the latter either way, and cross-connected means between the unbalancing means and said automatic power controls, whereby the operation of either unbalancing means to change the power value on one side automatically actuates the power control of the opposite side to bring about coöperation of that side supplementing the said unbalancing action.

11. In a servo-motor, the combination of a load member movable in opposite directions and oppositely acted upon by two forces exerted by the pressure of two bodies of fluid, a control member also movable in opposite directions, a pair of alternately operable valves actuated by differential movement of either of said members with respect to the other, for alternately altering the pressure of said bodies of fluid and so unbalancing said forces, and valve mechanism automatically controlled by the pressure of said bodies of fluid for maintaining the unbalancing effect due to change in pressure in the body of fluid acted upon by the said valve of the first-mentioned pair of valves by reversely altering the pressure of the other body of fluid.

12. In a servo-motor, the combination of a load member movable in opposite directions and oppositely acted upon by two forces exerted by the pressure of two independent bodies of fluid, a control member also movable in opposite directions, a pair of alternately operable valves mechanically actuated by differential movement of either of said members with respect to the other, for alternately altering the pressure of said bodies of fluid and so unbalancing said forces, and a pair of valves automatically controlled respectively by the pressure of said bodies of fluid for assisting the unbalancing effect due to change in pressure in the body of fluid acted upon by the said valve of the first-mentioned pair of valves by reversely influencing the pressure of the other body of fluid.

13. In a servo-motor, the combination of a load member movable in opposite directions and oppositely acted upon by two forces exerted by the pressure of two independent bodies of fluid, a control member also movable in opposite directions, a pair of alternately operable valves mechanically actuated by differential movement of either of said members with respect to the other, for alternately reducing the pressure of said bodies of fluid and so unbalancing said forces, and a pair of valves automatically actuated respectively by reduction of the pressure of said bodies of fluid for assisting the unbalancing effect due to change in pressure in the body of fluid acted upon by the said valve of the first-mentioned pair of valves by maintaining the pressure of the other body of fluid.

14. In a device of the class described, the combination of a control member, a load member acted upon by opposed normally equilibrized forces, mechanism for diminishing said forces alternately, mechanically arranged differentially with respect to said members so that independent movement of either of said members will actuate said mechanism to reduce one of said forces, and mechanism mechanically independent of the first-mentioned mechanism but actuated automatically thereby indirectly by the reduction in said force for preventing a reduction in the other force upon movement of said load member.

15. In a servo-motor, the combination of double-acting cylinder means, a piston member for said cylinder means, a control member movable in opposite directions, a source of fluid pressure for operating said piston in said cylinder, a pair of alternately operable valves mechanically actuated by differential movement of either of said members with respect to the other, for alternately reducing the pressure of fluid in respective ends of said cylinder means, and a pair of valves automatically actuated respectively by reduction of the pressure of fluid in said cylinder ends for admitting fluid to the end of the cylinder opposite to that in which the pressure has been reduced.

16. In a servo-motor, the combination of a double-acting cylinder means, a piston member for said cylinder means, a control member movable in opposite directions, a source of fluid pressure for operating said piston in said cylinder, a pair of alternately operable valves mechanically actuated by differential movement of either of said members with respect to the other, for alternately reducing the pressure in respective ends of said cylinder means, a pair of valves for admitting fluid under pressure to opposite ends of the said cylinder means, and means normally tending to close said valves.

17. In a servo-motor, the combination of double-acting cylinder means, a piston member for said cylinder means, a control member movable in opposite directions, a source of fluid pressure for operating said piston in said cylinder, a pair of alternately operable valves mechanically actuated by differential movement of either of said members with respect to the other, for alternately reducing the pressure of fluid in respective ends of said cylinder means, a pair of independently operable valves for admitting fluid under pressure to opposite ends of the said cylinder means, and means normally tending to close said valves.

18. In a servo-motor, the combination of a double-acting cylinder means, a piston member for said cylinder means, a control member movable in opposite directions, a source of fluid pressure for operating said piston in said cylinder, a pair of alternately operable valves mechanically actuated by differential movement of either of said members with respect to the other, for alternately reducing the pressure in respective ends of said cylinder means, a pair of valves for admitting fluid under pressure to opposite ends of said cylinder means, and means normally tending to close said valves, said valves being suitably arranged to be opened by the pressure of the fluid supply.

19. In a servo-motor, the combination of double-acting cylinder means, a piston member for said cylinder means, a control member movable in opposite directions, a source of fluid pressure for operating said piston in said cylinder, a pair of alternately operable valves mechanically actuated by differential movement of either of said members with respect to the other, for alternately reducing the pressure in respective ends of said cylinder means, a pair of valves for admitting fluid under pressure to opposite ends of said cylinder means, and means normally tending to close said valves and including members operated by the pressure of fluid in the opposite cylinder ends, said valves being suitably arranged to be opened by the pressure of the fluid supply.

20. In a servo-motor, the combination of double-acting cylinder means, a piston member for said cylinder means, a control member movable in opposite directions, a source of fluid pressure for operating said piston in said cylinder, a pair of alternately operable valves mechanically actuated by differential movement of either of said members with respect to the other, for alternately reducing the pressure in respective ends of said cylinder means, a pair of valves for admitting fluid under pressure to opposite ends of said cylinder means, and means normally tending to close said valves and including members operated by the pressure of fluid in the opposite cylinder ends, said valves being suitably arranged to be opened by the pressure of the fluid supply and the arrangement being such that said valve-closing means is superior to the fluid supply pressure, whereby the pressure in said cylinder means is normally maintained at a less value than the pressure of the fluid supply.

21. In a device of the class described, the combination of an oscillatable member operated by opposed forces, and control mechanism operating independently of said member by the inequality of the opposed forces to regulate the movement of said member.

22. In a device of the class described, the combination of an oscillatable member operable by opposed normally equilibrized forces and control mechanism operable independently of said member by variations in the opposed forces to regulate the movement of said member.

23. In a device of the class described, the combination of an oscillatable member having pressure chambers for applying pressure oppositely to said member, an inlet valve to each chamber and pressure operated means controlling the valve of each chamber by the pressure in the other chamber and operable by inequality of pressure in the chambers.

24. In a device of the class described, the combination of a movable member acted upon by two opposing pressures, independent exhaust and inlet valves for controlling the pressure, the former being directly operated and the latter being operated indirectly through the variation in pressure effected by the operation of the exhaust valve.

LINCOLN A. LANG.